United States Patent
Doherty

[19]

[11] Patent Number: 6,147,304
[45] Date of Patent: Nov. 14, 2000

[54] ELECTRICAL OUTLET BOX

[76] Inventor: James W. Doherty, 107 Collins St., Danvers, Mass. 01923

[21] Appl. No.: 09/263,004

[22] Filed: Mar. 5, 1999

[51] Int. Cl.⁷ .................................................. H02G 3/04
[52] U.S. Cl. .............................. 174/48; 174/50; 174/58; 220/3.8; 220/3.02
[58] Field of Search ................ 174/48, 50, 58, 174/17 R, 52.4, 66, 60; 220/3.2, 3.8, 4.02, 241, 3.6

[56] References Cited

U.S. PATENT DOCUMENTS

| | | | |
|---|---|---|---|
| 3,179,738 | 4/1965 | Lyon | 439/350 |
| 4,134,636 | 1/1979 | Kleinatland et al. | 439/535 |
| 4,135,337 | 1/1979 | Medlin | 220/3.3 |
| 4,451,108 | 5/1984 | Skidmore | 339/177 R |
| 4,612,412 | 9/1986 | Johnston | 174/65 R |
| 4,616,104 | 10/1986 | Lindsey | 174/48 |
| 4,778,399 | 10/1988 | Schenk | 439/147 |
| 5,189,256 | 2/1993 | Epple | 174/50 |
| 5,362,922 | 11/1994 | Whitehead | 174/48 |
| 5,419,716 | 5/1995 | Sciammarella et al. | 439/540 |
| 5,574,256 | 11/1996 | Cottone | 174/53 |
| 5,594,207 | 1/1997 | Fabian et al. | 174/58 |
| 5,598,998 | 2/1997 | Lynn | 248/300 |
| 5,646,371 | 7/1997 | Fabian | 174/58 |
| 5,831,212 | 11/1998 | Whitehead et al. | 174/50 |
| 5,933,563 | 8/1999 | Schaffer et al. | 385/135 |
| 5,965,844 | 10/1999 | Lippa | 174/49 |

*Primary Examiner*—Kristine Kincaid
*Assistant Examiner*—Dhiru R Patel
*Attorney, Agent, or Firm*—Joseph R. Birkner

[57] ABSTRACT

An electrical outlet box for selectively receiving both high voltage and low voltage conductors and electrical components such as an a.c. 120 V power outlet, a telephone jack and a cable television (CATV) adapter. The electrical outlet box has a housing with a first section juxtaposed in spaced relationship with respect to a second section. Means for fastening the electrical components to the housing includes a tab with a hole to receive a screw. First and second receiving means disposed on the housing for receiving the high and low voltage conductors may include knock outs in a first section and a plurality of holes in the second section. An open back in the second section of the housing may also be provided. The first and second sections of the housing being joined by a bridge portion. The bridge portion being sized to permit the use of standard cover plates which results in an aesthetically pleasing installation such that a portion of a wallboard, fitting between the first and second sections of the housing, is visible when installation is complete. The electrical outlet box being attachable to a stud with an attaching means which comprises a boss having an opening therein to receive a fastener such as a nail or a threaded member such as a screw.

20 Claims, 3 Drawing Sheets

ELECTRICAL OUTLET BOX

FIELD OF THE INVENTION

This invention relates generally to electrical outlet boxes. More particularly, the present invention relates to an electrical outlet box for receiving both high voltage and low voltage conductors and electrical components. The electrical outlet box has a housing with a first section juxtaposed in spaced relationship with respect to a second section. The first and second sections of the housing being joined by a bridge portion and the electrical outlet box being attachable to a stud.

BACKGROUND OF THE INVENTION

It was recognized by the present inventor while installing electrical outlet boxes for a.c. 120 V components, during new construction to a stud and to a wall, that more often than not, the stud and wall space is limited, especially, for conveniently also installing telephone and cable television (CATV) where they are needed. There simply is not enough room to accommodate such installations particularly between adjacent rooms and when it is required to share a stud for mounting the electrical outlet boxes.

Various ways for accommodating high voltage electrical components such as an a.c. 120 V duplex power receptacle (power outlet) and low voltage components such as a telephone component (jack) and a cable television (CATV) component (adapter) and various combinations thereof, attempted in the past, include attachments such as brackets, adapters, independently ganged housings and others. Such devices are inconvenient to use, expensive, time consuming to install, require special cover plates, costly to produce, are not readily adaptable for field installation and may not adequately electrically isolate, separate and shield high voltage a.c. 120 V from low voltage requirements needed for telephone and for CATV applications.

U.S. Pat. No. 4,612,412 to Johnston, shows a plastic electrical outlet box assembly with a pair of identical separate outlet boxes connected together in a snap-together assembly and adjustably attachable to a separate mounting bracket attached to a stud wall in cantilever fashion for receiving a.c. duplex plug receptacles, cable TV and telephone jacks. The separate outlet boxes and the separate mounting bracket require parallel coengagaing rails and channel members to operate in snap-together assembly. This complicated box assembly construction also requires a separate, special mounting bracket thereby making the assembly costly to manufacture and may be difficult to properly align during installation as well as being inconvenient to wire.

U.S. Pat. No. 5,598,998 to Lynn shows a mounting bracket with a c-shaped frame that may be placed over a conventional electrical outlet box for receiving dual voltage outlets for an a.c. receptacle and cable TV and telephone. The bracket is made from 18 gage galvanized steel for rigidity and stability needed for mounting on the narrow face of a 2x4 wooden stud. Cover plate flanges are necessary to support the large cover plate.

U.S. Pat. No. 5,419,716 to Sciammarella shows a power outlet and a phone jack wall adapter. The Sciammarella device has several disadvantages, for example, it certainly is not suitable for selectively receiving an a.c. 120 V duplex power receptacle, a telephone jack and a cable television (CATV) adapter. Furthermore, the Sciammarella adapter is certainly not capable of being attachable to a stud instead it is attachable directly to a wall.

U.S. Pat. No. 4,778,399 to Schenk shows a multi-service electric outlet module for cable TV, telephone and computer systems. This design requires a centrally positioned open center section that is necessary to access the pre-installed low and high voltage components. The design uses a pair of mounting plates for the components with upper and lower triangular shaped flanges and separate upper and lower plate members which are recessed and are fixed within the housing. Schenk acknowledges the potential danger of high voltage particularly to small children due to the access opening necessary for using the invention. Schenk teaches the use of non-standard special designed enclosure plates to cover the open center section. The Schenk device has several disadvantages, for example, it's complicated cumbersome design, and the use of non-standard mounting plates, would not be usable for economically, safely, and selectively receiving various electrical components such as an a.c. 120 V power outlet, a telephone jack and a cable television (CATV) adapter, for example, in new building construction such as homes or office suites and wherever computer systems are not needed to be connectable. Further, for safety, a portion of the wall board could not be used to cover the open center section, rather, the device needs a special enclosure plate placed over the opening which defeats the purpose of the design by denying or limiting access to the high and low voltage services unless the enclosure plate is removed or is not installed. Furthermore, the open center section is certainly not aesthetically nor economically desirable for residential and certain commercial installations and may cause some safety concerns.

U.S. Pat. No. 5,574,256 to Cottone shows a wall outlet box for a.c. transformers/converters and a standard RJ-11 modular telephone jack connection on the face plate. Disadvantages of this device include the close proximity of the high voltage and low voltage component arrangement in the outlet box which could be a safety hazard. Furthermore, the design is not suitable for selectively receiving an a.c. 120 V power outlet, a telephone jack and a cable television (CATV) adapter.

U.S. Pat. No. 4,451,108 to Skidmore shows a data terminal service outlet mounted to a wall with both electrical power and a link with a central processing computer. One disadvantage of the Skidmore device is that it would not be usable for economically selectively receiving an a.c. 120 V power outlet, a telephone jack and a cable television (CATV) adapter, for example in new building construction such as homes or office suites and wherever a central processing computers are not needed to be connectable as taught by Skidmore.

Accordingly, it becomes clear that there is a great need for an electrical outlet box for safely receiving both high voltage and low voltage conductors and electrical components and for accommodating high voltage electrical components such as an a.c. 120 V duplex power receptacle (power outlet) and low voltage components such as a telephone component (jack) and a cable television (CATV) component (adapter). Such an electrical outlet box should be one that is easy to use, that is readily attachable to a stud, utilizes standard cover plates, is economically manufactured and is aesthetically pleasing when in use.

SUMMARY OF THE INVENTION

It is therefore an object of this invention to provide an electrical outlet box for safely receiving both high voltage and low voltage conductors and electrical components and for accommodating high voltage electrical components such as an a.c. 120 V duplex power receptacle (power outlet) and low voltage components such as a telephone component (jack) and a cable television (CATV) component (adapter).

It is also an object of this invention to provide an electrical outlet box that has a housing with a first section juxtaposed in a spaced relationship with respect to a second section.

It is also an object of this invention to provide a means for connecting the first section of the housing to the second section of the housing.

It is yet another object of this invention to provide an electrical outlet box that has the first and the second section of the housing integral with the connecting means.

It is also an object of this invention to provide an electrical outlet box that has a first means, disposed on the first section of the housing, for receiving the high voltage electrical conductors and a second means, disposed on the second section of the housing, for receiving the low voltage electrical conductors.

It is another object of this invention to provide a means for fastening the electrical components to the housing.

It is also an object of this invention to provide an electrical outlet box that is readily mountable to a stud in a cantilever fashion with a portion of the wall board being exposed when installed using standard cover plates for the housing.

It is a further object of this invention to provide an electrical outlet box that is simple in design, simple to manufacture, low in cost and easy to use.

This invention results from the realization that there is a great need for an efficient, convenient, practical, low cost and versatile electrical outlet box for safely receiving both high voltage and low voltage conductors and electrical components. The resulting invention provides a user the capability of installing dual voltage electrical components such as an a.c. 120 V duplex power receptacle (power outlet) and low voltage components such as a telephone component (jack) and a cable television (CATV) component (adapter) on a stud in new construction when there is limited space such as on adjoining walls.

The above and the other objects are achieved in accordance with the present invention, which, according to a first aspect, provides an electrical outlet box for receiving both high voltage and low voltage electrical conductors and electrical components comprising a housing having a first section and a second section; the first section of the housing juxtaposed in spaced relationship with respect to the second section; means for connecting the first section of the housing to the second section of the housing; first means, disposed on the first section of the housing, for receiving the high voltage electrical conductors; second means, disposed on the second section of the housing, for receiving the low voltage electrical conductors; means for fastening the electrical components to the housing and means for attaching the electrical outlet box to a stud. The means for connecting the first section of the housing to the second section of the housing comprises a bridge portion disposed between the first section of the housing and the second section of the housing to define a space therebetween to receive a wall board, to linearly align the first section with the second section, to separate, to safely shield and to isolate the high voltage and the low voltage electrical conductors and components. The bridge portion, the first section and the second section being integral with each other. The first means for receiving the high voltage electrical conductors comprises the first section of the housing having a knock out disposed thereon. The second means for receiving the low voltage electrical conductors includes the second section of the housing having an open back wall therein to receive the low voltage electrical conductors for the electrical components such as a telephone electrical component and a CATV electrical component. The fastening means includes a tab having an opening therein to receive a screw; the tab disposed on the housing. The means for attaching the electrical outlet box to the stud, comprises a boss disposed on the housing; the boss having an opening therein for receiving a fastener.

According to a second aspect of the invention, an electrical outlet box for receiving both high voltage and low voltage electrical conductors and electrical components is disclosed. The second aspect is a special case of the first aspect of this invention with additional features. The first section and the second section of the housing may be rectangular in shape and each section being equal in width and in height so that standard cover plates may be used and be removably attachable to the tab which is disposed on the top wall and on the bottom wall of both sections of the housing. The first section has walls which define a first enclosure with a back wall and an open front wall. The knock out being disposed within a weak wall portion of at least one wall of the first section of the housing for receiving the high voltage conductors. The boss may be disposed on at least one wall of the first section of the housing; the boss for conveniently attaching the electrical outlet box to the stud prior to installation of the wall board. The second section has walls which define a second enclosure with an open back wall and an open front wall. The low voltage electrical conductors and the low voltage electrical components may be readily accessed and facilitated from the open back wall of the second enclosure of the electrical outlet box when the electrical outlet box is installed on the stud during new construction. Further, the bridge portion may be lesser in depth than the depth of either the first section of the housing or than the depth of the second section of the housing. The width of the bridge portion is sized to define the space therebetween the first section of the housing and the second section of the housing so that a first standard cover plate may be removably attachably received on the tab on the first section of the housing and secured thereto with the screw, and a second standard cover plate may be removably attachably received on the tab on the second section of the housing, without interference, and secured thereto with the screw, and with sufficient clearance, so that the portion of the wall board fitting between, in the space defined by, the first section and the second section of the housing in close proximity to the bridge portion, is visible when installation of the electrical outlet box on the stud is complete. To provide additional access, the second receiving means may further include a hole disposed in at least one wall of the second section. The hole may include one which penetrates the second enclosure or it may include a knock out which would be disposed in a weak wall portion. The hole may be sized to receive both the low voltage electrical conductors for a telephone electrical component and for a CATV electrical component. Separate holes may also be provided for receiving the low voltage conductors for each individual low voltage component. Further, the second enclosure of the second section of the housing may be lesser, in depth, than the depth of the first enclosure of the first section of the housing for additional access to the low voltage electrical conductors.

According to a third aspect of the invention, an electrical outlet box is disclosed similar to the first and second aspects of this invention and provides an electrical outlet box for receiving both a high voltage electrical conductor, such as an a.c. 120 V high voltage electrical conductor, and a low voltage electrical conductor, and for receiving electrical components such as an a.c. 120 V high voltage duplex power receptacle and a low voltage telephone electrical component and a cable television electrical component. The third aspect of this invention combines the pertinent features of the second aspect in addition to more distinguishing features and is a special case of the second aspect. The first section and the second section of the housing, both, being rectangular in shape and each being equal in width and in height. The first receiving means may include a plurality of knock outs being disposed within the weak wall portion of the top wall of the first section of the housing for receiving the high voltage conductors. The second receiving means further includes the bottom wall and the top wall of the second section, each wall, having a plurality of holes disposed therein to increase accessibility and to further facilitate installation of the electrical outlet box. Although not necessary, preferably, the plurality of holes may be of two different hole distribution patterns with two different hole diameters; the plurality of holes penetrating the second enclosure; the smaller diameter hole for selectively receiving the low voltage conductor for a telephone electrical component and the larger diameter hole for receiving the low voltage conductor for a cable television electrical component. Further, the second enclosure of the second section of the housing may be lesser, in depth, than the depth of the first enclosure of the first section of the housing for additional access to the low voltage electrical conductors. The bridge portion being sufficient in width to define the space therebetween the first section of the housing and the second section of the housing so that a first standard cover plate, for the a.c. 120 V high voltage electrical duplex power receptacle, may be removably attachably received on the tab on the first section of the housing and secured thereto with the screw, and a second standard cover plate, for the low voltage telephone electrical component and for the cable television electrical component, may be removably attachably received on the tab on the second section of the housing, without interference, and secured thereto with the screw, and with sufficient clearance, so that the portion of the wall board fitting between, in the space defined by, the first section and the second section of the housing, in close proximity to the bridge portion, is visible when installation of the electrical outlet box on the stud is complete thereby providing an aesthetically pleasing and functional installation. The electrical components such as the a.c. 120 V high voltage duplex power receptacle and the low voltage telephone electrical component and the cable television electrical component being fastened to the tab with the screw. The bridge portion being rectangular in shape and being lesser in depth than the depth of either the first section of the housing or than the depth of the second section of the housing; the bridge portion may, preferably, have a hollow section therein for economy of manufacture.

DETAILED DESCRIPTION OF PREFERRED EMBODIMENTS

Figure 1:
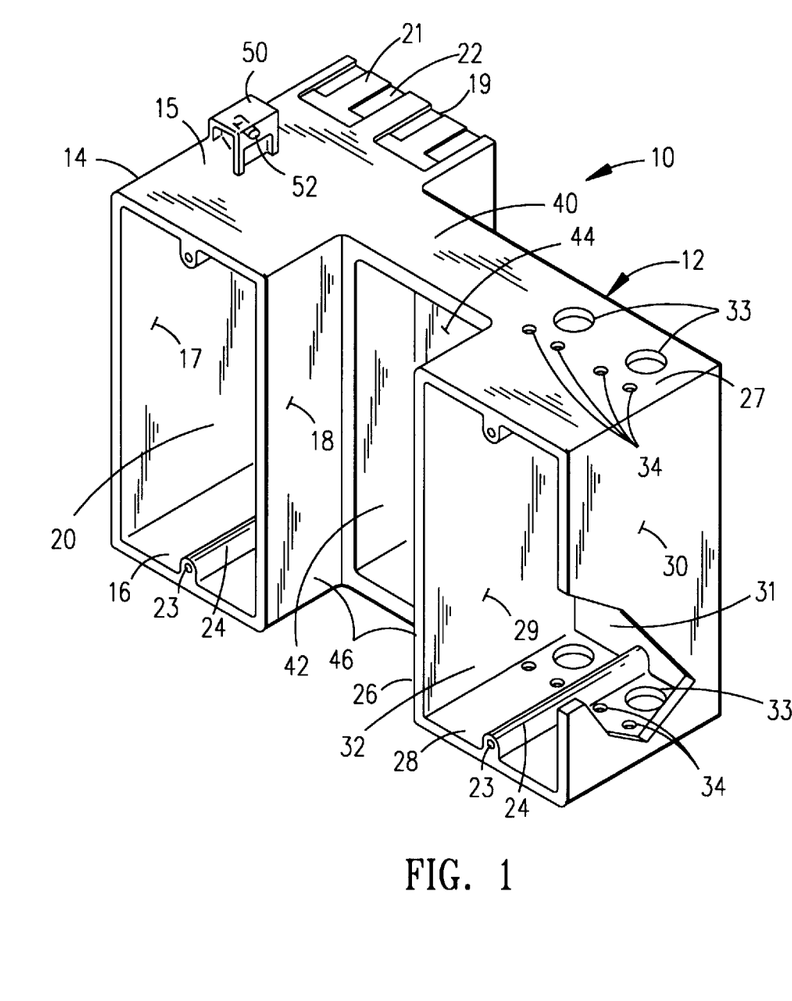
FIG. 1 is a perspective view of a preferred embodiment of the electrical outlet box.

Looking more particularly to the drawings, FIG. 1 depicts a perspective view of a preferred embodiment of the electrical outlet box, which is indicated generally at 10, according to a preferred embodiment of the present invention. Electrical outlet box 10, essentially comprises a housing 12 with a first section 14 juxtaposed in spaced relationship with respect to a second section 26. The first section 14 and the second section 26 of the housing 12 having a connecting means therebetween, which comprises a bridge portion 40. The bridge portion 40 being disposed between the first section 14 of the housing 12 and the second section 26 of the housing 12 to define a space 46 therebetween. The purpose of the bridge portion 40 is to linearly align the first section 14 with the second section 26, to separate, to safely shield and to isolate the high voltage and the low voltage electrical conductors and components from each other and to receive a wall board 100 (shown in FIG. 3); a portion of the wall board 100 fitting between in close proximity to the bridge portion 40, in the space 46 defined by, the first section 14 and the second section 26 of the housing. The bridge portion 40, the first section 14 and the second section 26 of the housing 12 being formed integral with each other thereby creating an electrical outlet box 10 that eliminates the installation problems mentioned which are associated with the separate individual outlet boxes and provides an electrical outlet box 10 which is integral for convenient use in dual voltage applications and where there is limited stud and wall space.

The electrical outlet box 10 being attachable to a stud 90 (shown in FIG. 3), with an attaching means such as a boss 50, with an opening 52 therein for receiving a fastener 92 such as a nail or a threaded member such as a screw. The boss 50 may be disposed on the top wall 15 and on the bottom wall 16 of the first section 14 of the housing 12 (shown in FIG. 2).

Figure 3:
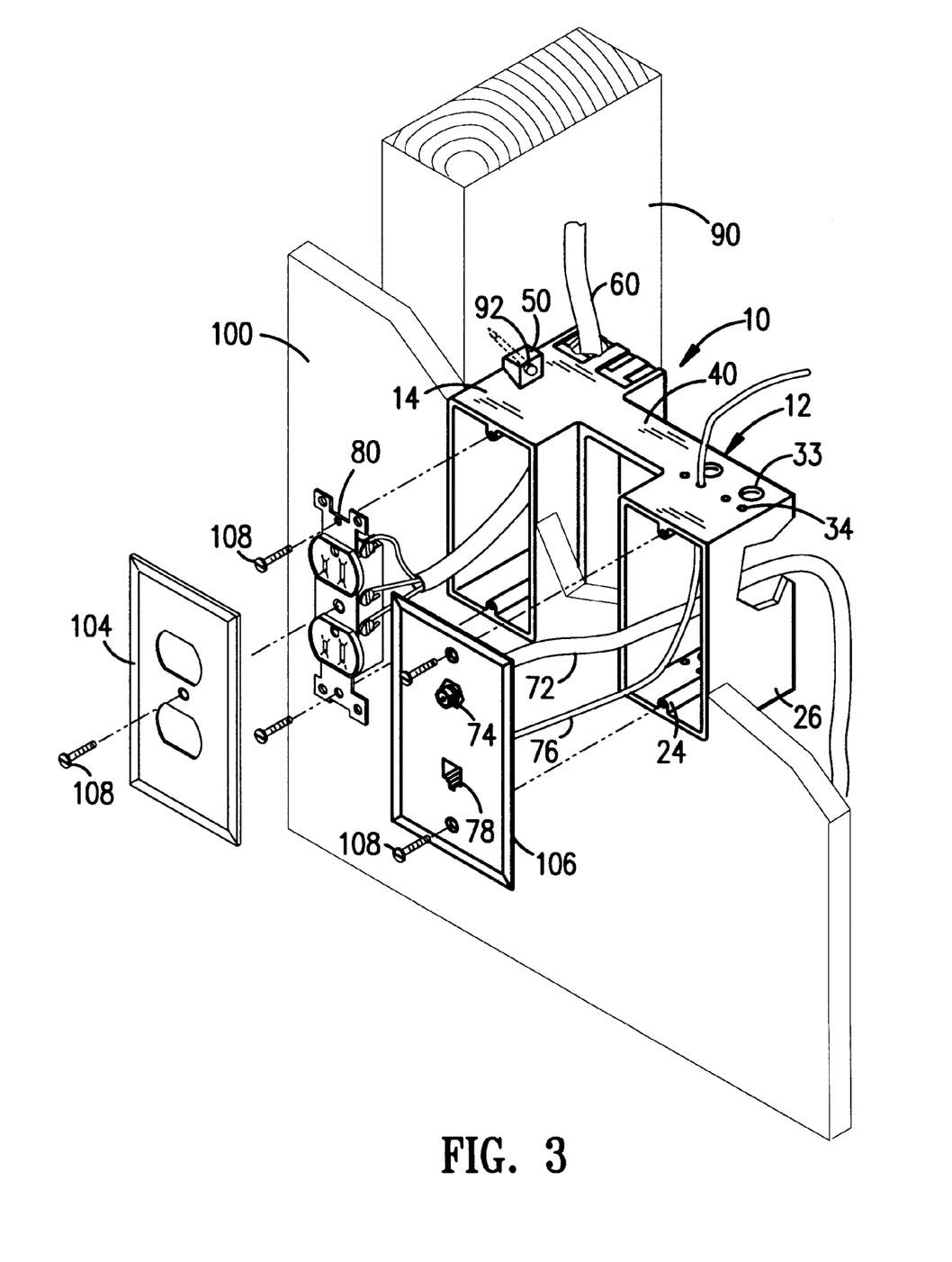
FIG. 3 is a perspective view of a preferred embodiment of the electrical outlet box of FIG. 1 in use when mounted on a stud according to the teaching of this invention.

More particularly, preferably, the first section 14 and the second section 26 of the housing 14, both, being rectangular in shape and each being equal in width and in height so that a first standard cover plate 104 and a second standard cover plate 106 may be used as shown in FIG. 3. Use of standard cover plates permits easy field installation and interchangeability, as needed, due to color schemes or for use with a particular electrical component that is selected for an installation.

The first section 14 of the housing 12 has a top wall 15, a bottom wall 16, a right side wall 18 a left side wall 17 and a back wall 19. Each side wall being parallel to each other and attached to the top wall 15 and to the bottom wall 16 and to the back wall 19 to define a first enclosure 20 with an open front wall. The first receiving means for receiving the high voltage electrical conductors may consist of a plurality of selectively removable knock outs 21 disposed in a weak wall portion 22 of both the top wall 15 and the bottom wall 16 of the first section 14 of the housing 12. The knock outs 21 may be located near the back wall 19 of the first section 14.

The second section 26 of the housing 12 has a top wall 27, a bottom wall 28, a right side wall 30 and a left side wall 29. Each side wall being parallel to each other and attached to the top wall 27 and to the bottom wall 28 to define a second enclosure 32. The second means for receiving the low voltage electrical conductors includes the second section 26 of the housing 12 having an open back wall 31 therein to receive the low voltage electrical conductors 72,76 for the electrical components such as a cable television (CATV) electrical component 74 and a telephone electrical component 78.

The low voltage electrical conductors 72,76 and the low voltage electrical components 74,78 may be readily accessed and facilitated from the open back wall 31 of the second enclosure 32 of the electrical outlet box 10 when the electrical outlet box 10 is installed on the stud 90 (shown in FIG. 3) during new construction.

To provide additional access options, and to make the electrical outlet box 10 more useful, the second receiving means may further comprise a plurality of holes 33,34 disposed in each wall of the bottom wall 28 and of the top wall 27 of the second section 26, for receiving the low voltage electrical conductors 72,76. The plurality of holes 33,34, may be of two different hole distribution patterns with two different hole diameters being disposed in both the bottom wall 28 and in the top wall 27 of the second section 26 and penetrating the second enclosure 32. The smaller diameter hole 34 for receiving the low voltage conductor 76 for a telephone electrical component 78 and the larger diameter hole 33 for receiving the low voltage conductor 72 for a CATV electrical component 74. It is understood that various hole patterns, diameters and the number of holes and their placement are possible and that at least one larger diameter hole 33 could be used for receiving both the low voltage conductor 76 for a telephone electrical component 78 and for receiving the low voltage conductor 72 for a CATV electrical component 74. The plurality of holes 33,34 penetrate the second enclosure 32. It is understood that in lieu of the plurality of holes 33,34, the top wall 27 and bottom wall 28 of the second section 26 may alternately, be adapted for knock outs 21 which may be disposed within a weak wall portion 22 in a manner as previously described. Furthermore, the plurality of holes 33,34 including the diameter and hole pattern as well as their disposition on a particular wall may be modified or eliminated as required for a particular application or for manufacturing convenience. The above mentioned modifications, and other variations, are understood to be adaptable to the instant invention without departing from the intent and scope of this disclosure.

For ease of manufacture, the tab 24, disposed internally, within the first enclosure 20 may continuously extend along the top wall 15 and the bottom wall 16 and the tab 24, disposed internally within the second enclosure 32 may continuously extend along the top wall 27 and the bottom wall 28.

Figure 2:
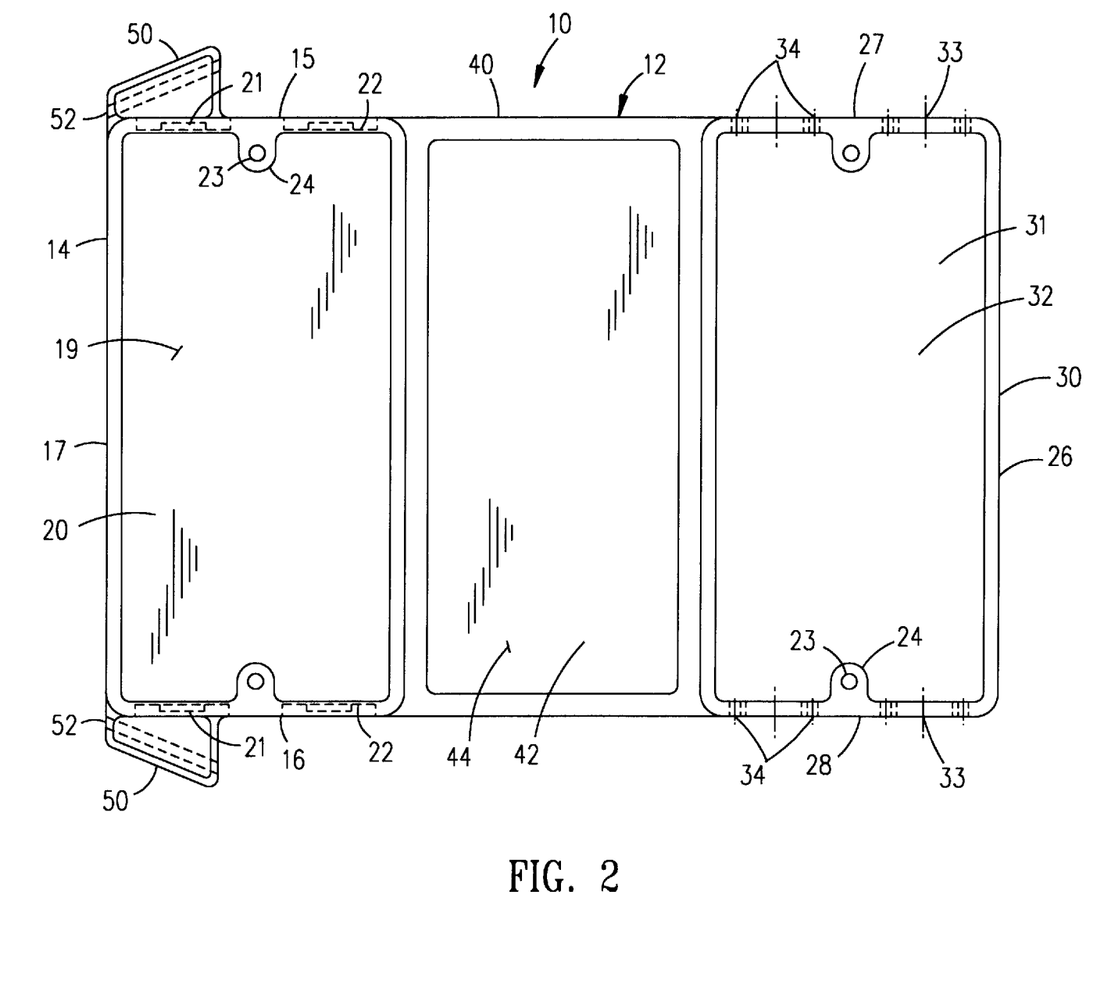
FIG. 2 is a front elevation view of a preferred embodiment of the electrical outlet box of FIG. 1.

FIG. 2 is a front elevation view of a preferred embodiment of the electrical outlet box of FIG. 1 which shows the boss 50 being disposed on both the top wall 15 and on the bottom wall 16 of the first section 14 of the housing 12. Also, back wall 19 of the first section 14 is shown. The knock out 21 is shown in the weak wall portion 22 of each wall, the top wall 15 and the bottom wall 16 of the first section 14. The second section 26 shows the open back wall 31 and the plurality of holes 33 and 34 which are preferably disposed in both the top wall 27 and in the bottom wall 28 of the second section 26. The bridge portion 40 being rectangular in shape and being lesser in depth than the depth of either the first section 14 of the housing 12 or than the depth of the second section of the housing and the bridge portion 40. The bridge portion 40 may have a hollow section 42 therein to conserve material and for ease of manufacture. The hollow section 42 may be disposed between a back wall 44 and an open front wall. Due to the design features described, and due to symmetry, it is understood that the electrical outlet box 10 may be oriented in any convenient manner for mounting in a particular installation where stud and wall space is limited such as in adjoining rooms.

FIG. 3 is a perspective view of a preferred embodiment of the electrical outlet box of FIG. 1 in use when mounted on a stud according to the teaching of this invention.

To use the present invention, a user may mount the electrical outlet box 10 as illustrated in FIG. 3, on the stud 90, in a cantilever fashion, via the mounting means which comprises the boss 50 having the opening 52 therein to receive the fastener 92, such as a nail or a threaded member such as a screw. Hence, it is understood that the electrical outlet box 10 may be adaptable for installation on either wood or on metal studs, preferably, during new construction.

After the electrical outlet box 10 of FIG. 1 is secured to the stud 90 with the fastener 92, the high voltage electrical conductor 60 may be insertable into the knock out 21 formed within the weak wall portion 22 of the top wall 15 and the bottom wall 16 of the first section 14 of the housing 12 by puncturing the knock out 21 and removing it to provide an opening for the high voltage electrical conductor 60.

After the high voltage electrical conductor 60 is stripped to expose the color coded wire strands, electrical connections to a high voltage component such as an a.c. 120 V electrical duplex power receptacle (power outlet) 80 may be made in a conventional manner according to the electrical code. It is understood that other high voltage individual components and combinations thereof such as an electrical switch, a combination of an electrical switch and a power outlet and a dedicated power outlet may be alternately installed on the electrical outlet box 10 as required.

The power outlet 80 may be received in the first section 14 and terminate within the first enclosure 20 when the power outlet 80 is secured to the first section 14 of the housing 12 by the fastening means which comprises the tab 24 with the hole 23 therein for receiving the screw 108.

Next, the low voltage electrical conductor for cable television (CATV) 72 may be selectively insertable into and routed via the second means for receiving the low voltage electrical conductors such as the open back wall 31 in the second section 26.

Next, the low voltage electrical conductor 76 for a telephone (jack) 78 may be selectively insertable into the hole 34 provided in the top wall 27 and in the bottom wall 28 of the second section 26 of the housing 12. It is understood that the low voltage electrical conductor 76 for the telephone (jack) 78 could also be routed via the open back wall 31 in the second section 26.

It is further understood that the low voltage electrical conductor 72,76 and may be routed via an appropriate hole 33,34 as required for a particular installation. It is further understood that the low voltage electrical conductor 72,76 may both be selectively insertable into the hole 33 provided in the top wall 27 and in the bottom wall 28 of the second section 26 of the housing 12 or may both be alternately routed via the open back wall 31 in the second section 26, to selectively and conveniently receive the low voltage electrical conductors 72,76 for the electrical components such as a telephone electrical component 78 and a CATV electrical component 74 and to access the components when the electrical outlet box 10 is attached to the stud 90 during new construction.

Surprisingly, when the electrical outlet box 10 is constructed such that the depth of the second enclosure 32 is less than the depth of the first enclosure 20 of the housing 12, the low voltage conductors 72,76 are further readily accessed and facillated.

Alternately, the electrical outlet box 10 could be fabricated with open back wall 31 of the second section 26 being closed, and, in that case, electrical conductor 72,76 could both be routed through the second receiving means such as at least one hole 33 or individually through the plurality of holes 33,34. Furthermore, it is also understood that the depth of the second enclosure 32 may be equal to the depth of the first enclosure 20 of the housing 12 without affecting operation.

After the electrical outlet box 10 is in place, as previously described, appropriate cut outs in wall board 100, to receive the first section 14 and the second section 26 of the housing 12 are made. The cut outs are such that when the wall board 100 is installed on the stud 90, a portion of the wall board 100 is exposed and fits in close proximity to the bridge portion 40 in the space 46 between the first section 14 and the second section 26 of the housing 12.

Next, a first standard cover plate 104 for the first section 14 of the housing 12 is removably attachably secured to the a.c. 120 V electrical duplex power receptacle 80 with the screw 108. Alternately, it is understood that a commercially available standard cover plate having the needed openings therein to accommodate various combinations of electrical components may be used on the electrical outlet box 10.

Then, although not necessary, preferably, a second standard cover plate 106 with a telephone (jack) 78 and a cable television (CATV) adapter 74 pre-mounted thereon is provided. It is understood that other low voltage individual components are commercially available which are not pre-mounted to a standard cover plate but may be adapted for use on the electrical outlet box 10.

Finally, the second standard cover plate 106 for the second section 26 of the housing 12 is removably attachably secured to the second section 26 of the housing 12 by the fastening means which comprises the tab 24 with the hole 23 therein for receiving the screw 108. The resulting finished installation allows a portion of the wall board 100 to be exposed and is visible when the previously mentioned cover plates are in place without any interference therebetween since the bridge portion 40 was sized appropriately thereby providing an aesthetically pleasing and functional installation.

Preferably, the electrical outlet box 10 may be made by molding from heat resistant dielectric, high impact plastic material or from a plastic composite material such that the first section 14, the second section 26 of the housing 12 and the bridge portion 40 being integral with each other. Any other suitable material such as metal may alternately be used for construction by conventional metal fabrication techniques. The electrical outlet box 10 may be constructed in a wide variety of sizes and may be ganged for use with various combinations of high voltage electrical components mentioned previously and low voltage electrical components such as a telephone electrical component, an RJ-11 telephone jack, a CATV electrical component, a LAN jack (local area network jack) or the like without departing from the scope of this disclosure.

One practical advantage of the invention is that it provides an efficient, convenient, practical, low cost and versatile electrical outlet box 10 that safely receives both high voltage and low voltage conductors and electrical components. Also, the electrical outlet box 10 is adaptable to being selectively usable with various types of high voltage and low voltage components while using standard cover plates. Another advantage of the invention is that the electrical outlet box 10 being constructed as a single piece, that is, integrally formed, preferably by plastic molding, a user can purchase the electrical outlet box 10 for use in applications where stud and wall space is limited such as between adjacent rooms. The invention provides convenience, timesaving and space for installation of the electrical outlet box 10 on the stud 90 during new construction. Of course, a wide variety of further uses and advantages of the present invention will become apparent to one skilled in the art.

As disclosed, it is apparent that the instant invention can provide other wiring and component selection options for various combinations of a.c. components, telephone and CATV components as required. One skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. An electrical outlet box for receiving both a high voltage electrical conductor and a low voltage electrical conductor and a low voltage electrical component and a high voltage electrical component comprising: a housing having a first section and a second section; said first section of said housing having a top wall, a bottom wall, a right side wall, a left side wall and a back wall; each said side wall of said first section being parallel to each other and attached to said top wall, to said bottom wall and to said back wall to define a first enclosure with an open front wall;

said second section of said housing having a top wall, a bottom wall, a right side wall and a left side wall, each said side wall of said second section being parallel to each other and attached to said top wall and to said bottom wall to define a second enclosure with a back wall and an open front wall;

said first section of said housing juxtaposed in spaced relationship with respect to said second section;

a bridge portion;

said bridge portion being disposed between said first section of said housing and said second section of said housing to define a space therebetween; said bridge portion to linearly align said first section with said second section, to separate, to safely shield and to isolate the high voltage electrical conductor and the low voltage electrical conductor and the low voltage electrical component and the high voltage electrical component and to receive a wall board; a portion of the wall board fitting between said bridge portion, in the space defined by, said first section and said second section of said housing;

a weak wall portion;

said weak wall portion disposed in at least one said wall of said first section of said housing with a knock out disposed within said weak wall portion thereof for receiving the high voltage electrical conductor;

said second section of said housing having a hole therein sized to receive the low voltage electrical conductor;

a tab having an opening therein to receive a screw for fastening the high voltage electrical component and the low voltage electrical component to said housing; said tab disposed on said housing; and means for attaching said electrical outlet box to a stud.

2. The electrical outlet box of claim 1 wherein said bridge portion, said first section and said second section being integral with each other whereby said electrical outlet box being constructed as a single piece thereby eliminating the need to utilize a special mounting plate and a cover for use in joining two separately attachable electrical boxes.

3. The electrical outlet box of claim 2 wherein said first section and said second section of said housing, both being rectangular in shape and the width of said bridge portion is sized to define the space therebetween said first section of said housing and said second section of said housing so that a first standard cover plate may be removably attachable received on said first section and a second standard cover plate may be removably attachably received on said second section, without interference, and with sufficient clearance, so that the portion of the wall board fitting between said bridge portion, in the space defined by, said first section and said second section of said housing, is visible when installation of said electrical outlet box on the stud is complete.

4. The electrical outlet box of claim 3 wherein said back wall of said second section of said housing being open to receive the low voltage electrical conductor for the low voltage electrical component which is a telephone electrical component or a cable television electrical component.

5. The electrical outlet box of claim 4 wherein said bottom wall and said top wall of said second section, each said bottom wall and said top wall of said second section, having a plurality of holes disposed therein for receiving the low voltage electrical conductor which is the low voltage telephone electrical component or the cable television electrical component.

6. The electrical outlet box of claim 5 wherein said means for attaching said electrical outlet box to the stud, comprises a boss disposed on said top wall and on said bottom wall of said first section of said housing; said boss having an opening therein for receiving a fastener for attaching said electrical outlet box to a side wall of the stud in a cantilever fashion prior to installation of the wall board and thereby allowing said electrical outlet box to be selectively oriented for mounting on the side wall of the stud, where an availability of wall space is limited which is in a corner between adjacent rooms.

7. An electrical outlet box for receiving both a high voltage electrical conductor and a low voltage electrical conductor and a low voltage electrical component and a high voltage electrical component comprising:

a housing having a first section and a second section; said first section of said housing having a top wall, a bottom wall, a right side wall, a left side wall and a back wall; each said side wall of said first section being parallel to each other and attached to said top wall, to said bottom wall and to said back wall to define a first enclosure with an open front wall; said second section of said housing having a top wall, a bottom wall, a right side wall and a left side wall; each said side wall of said second section being parallel to each other and attached to said top wall and to said bottom wall to define a second enclosure with an open back wall and an open front wall; said first section of said housing juxtaposed in spaced relationship with respect to said second section; a bridge portion;

said bridge portion being disposed between said first section of said housing and said second section of said housing to define a space therebetween; said bridge portion to linearly align said first section with said second section, to separate, to safely shield and to isolate the high voltage electrical conductor and the low voltage electrical conductor and the low voltage electrical component and the high voltage electrical component and to receive a wall board; a portion of the wall board fitting between said bridge portion, in the space defined by, said first section and said second section of said housing; said bridge portion, said first section and said second section being integral with each other; a weak wall portion; said weak wall portion disposed in at least one said wall of said first section of said housing with a knock out disposed within said weak wall portion thereof for receiving the high voltage electrical conductor; a tab having an opening therein to receive a screw for fastening the high voltage electrical component and the low voltage electrical component to said housing; said tab disposed on said housing; and means for attaching said electrical outlet box to a stud.

8. The electrical outlet box of claim 7 wherein said second of said housing, both, being rectangular in shape and each being equal in width and in height.

9. The electrical outlet box of claim 8 wherein said attaching means comprises a boss disposed on said wall top wall and on said bottom wall of said first section of said housing; said boss having an opening therein for receiving a fastener for attaching said electrical outlet box to the stud prior to installation of the wall board.

10. The electrical outlet box of claim 9 wherein the low voltage electrical conductor and the low voltage electrical component may be readily accessed and facilitated from the open back wall of said second enclosure of said electrical outlet box when said electrical outlet box is installed on the stud during new construction.

11. The electrical outlet box of claim 10 wherein said bridge portion being lesser in depth than the depth of either said first section of said housing or than the depth of said second section of said housing.

12. The electrical outlet box of claim 11 wherein the width of said bridge portion is sized to define the space therebetween said first section of said housing and said second section of said housing so that a first standard cover plate may be removably attachably received on said tab on said first section of said housing and secured thereto with the screw, and a second standard cover plate may be removably attachably received on said tab on said second section of said housing, without interference, and secured thereto with the screw, and with sufficient clearance, so that the portion of the wall board fitting between in close proximity to said bridge portion, in the space defined by, said first section and said second section of said housing, is visible when installation of said electrical outlet box on the stud is complete.

13. The electrical outlet box of claim 12 further includes at least one said wall of said second section having a hole disposed therein and the hole being sized to receive the low voltage electrical conductor for both a telephone electrical component and for a cable television electrical component.

14. The electrical outlet box of claim 13 wherein said second enclosure of said second section of said housing being lesser, in depth, than the depth of said first enclosure of said first section of said housing.

15. The electrical outlet box of claim 14 wherein the low voltage electrical conductor and the low voltage electrical component may be selectively accessed from the open back wall of said second enclosure and from the hole disposed in at least one said wall of said second section when said electrical outlet box is installed on the stud during new construction.

16. An electrical outlet box for receiving both a high voltage electrical conductor, and a low voltage electrical conductor, and for receiving a high voltage duplex power receptacle and a low voltage electrical component, and a low voltage telephone electrical component and a cable television electrical component comprising:

a housing having a first section and a second section;

said first section of said housing having a top wall, a bottom wall, a right side wall, a left side wall and a back wall; each said side wall of said first section being parallel to each other and attached to said top wall, to said bottom wall and to said back wall to define a first enclosure with an open front wall;

said second section of said housing having a top wall, a bottom wall, a right side wall and a left side wall; each said side wall of said second section being parallel to each other and attached to said top wall and to said bottom wall to define a second enclosure with an open back wall and an open front wall; said first section and said second section of said housing, both, being rectangular in shape and each being equal in width and in height; said first section of said housing juxtaposed in spaced relationship second section; a tab having an opening therein to receive a screw for fastening the high voltage duplex power receptacle and the low voltage telephone electrical component and the cable television electrical component, to said housing; said tab being disposed on said top wall and on said bottom wall of both said first section and said second section of said housing; a bridge portion;

said bridge portion being disposed between said first section of said housing and said second and section of said housing to define a space therebetween; said bridge portion to linearly align said first section with said second section, to separate, to safely shield and to isolate the high voltage electrical conductor and the low voltage electrical conductor and the low voltage electrical component and the high voltage electrical component and to receive a wall board; a portion of the wall board fitting between said bridge portion, in the space defined by, said first section and said second section of said housing;

said bridge portion being sufficient in width to define the space therebetween said first section of said housing and said second section of said housing so that a first standard cover plate, for the high voltage electrical duplex power receptacle, may be removably attachably received on said tab on said first section of said housing and secured thereto with the screw, and a second standard cover plate, for the low voltage telephone electrical component and for the cable television electrical component, may be removably attachably received on said tab on said second section of said housing, without interference, and secured thereto with the screw, and with sufficient clearance, so that the portion of the wall board fitting between, in the space defined by, said first section and said second section of said housing, in close proximity to said bridge portion, is visible when installation of said electrical outlet box on the stud is complete thereby providing an aesthetically pleasing and functional installation; said bridge portion, said first section and said second section being integral with each other; a weak wall portion; said weak wall portion disposed in said top wall and in said bottom wall of said first section of said housing, each said wall of said first section, having a plurality of knock outs disposed within said weak wall portion thereof for receiving the high voltage electrical conductor; said bottom wall and said top wall of said second section, each said wall of said second section, having a plurality of holes disposed therein for receiving the low voltage electrical conductor, and the low voltage telephone electrical component and the cable television electrical component; and a boss disposed on said top wall and on said bottom wall of said first section of said housing; said boss having an opening therein for receiving a fastener for attaching said electrical outlet box to the stud prior to installation of the wall board.

17. The electrical outlet box of claim 16 wherein the plurality of holes, disposed in each said wall of said bottom wall and of said top wall of said second section, for receiving the low voltage electrical conductor, being of two different hole distribution patterns with two different hole diameters; the plurality of holes in each said wall of said bottom wall and of said top wall of said second section, penetrating said second enclosure of said second section of said housing; a smaller diameter hole for receiving the low voltage conductor for the telephone electrical component and a larger diameter hole for receiving the low voltage conductor for the cable television electrical component.

18. The electrical outlet box of claim 17 wherein said second enclosure of said second of said housing being lesser, in depth, than the depth of said first enclosure of said first section of said housing.

19. The electrical outlet box of claim 18 wherein the low voltage electrical conductor and the low voltage electrical component may be selectively accessed from the open back wall of said second enclosure and from the plurality of holes when said electrical outlet box is installed on the stud during new construction.

20. The electrical outlet box of claim 19 wherein said bridge portion being rectangular in shape and being lesser in depth than the depth of either said first section of said housing or than the depth of said second section of said housing and said bridge portion having a hollow section therein.

* * * * *